United States Patent
Maka et al.

(10) Patent No.: US 9,139,158 B2
(45) Date of Patent: Sep. 22, 2015

(54) RESTRAINING DEVICE FOR A RIDER OF A VEHICLE, METHOD FOR USING SUCH A RESTRAINING DEVICE, GARMENT FOR A RIDER OF A VEHICLE, AND SAFETY SYSTEM FOR THE DETACHABLE BINDING OF A RIDER TO A VEHICLE

(71) Applicants: Torsten Maka, Stuttgart (DE); Anja Wahl, Markgroeningen (DE); Marielle Cuvillier, Stuttgart (DE)

(72) Inventors: Torsten Maka, Stuttgart (DE); Anja Wahl, Markgroeningen (DE); Marielle Cuvillier, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/337,917

(22) Filed: Jul. 22, 2014

(65) Prior Publication Data
US 2015/0021897 A1 Jan. 22, 2015

(30) Foreign Application Priority Data

Jul. 22, 2013 (DE) .................. 10 2013 214 298

(51) Int. Cl.
| | | |
|---|---|---|
| *B62J 27/00* | (2006.01) | |
| *B60R 22/14* | (2006.01) | |
| *A41D 1/00* | (2006.01) | |
| *A41D 13/00* | (2006.01) | |
| *B60R 22/46* | (2006.01) | |
| *B60R 21/013* | (2006.01) | |
| *B60R 21/00* | (2006.01) | |

(52) U.S. Cl.
CPC ............... *B60R 22/14* (2013.01); *A41D 1/005* (2013.01); *A41D 13/0007* (2013.01); *B60R 21/013* (2013.01); *B60R 22/46* (2013.01); *B62J 27/00* (2013.01); *A41D 2600/102* (2013.01); *B60R 2021/0088* (2013.01)

(58) Field of Classification Search
USPC ........................ 280/808; 2/905; 297/465, 468
See application file for complete search history.

(56) References Cited

U.S. PATENT DOCUMENTS

| | | | | | |
|---|---|---|---|---|---|
| 4,359,129 | A | * | 11/1982 | Schultz | 180/268 |
| 4,759,569 | A | * | 7/1988 | Potter | 280/748 |
| 5,031,960 | A | * | 7/1991 | Day | 297/254 |
| 5,562,326 | A | * | 10/1996 | Stroud | 297/465 |
| 6,793,033 | B2 | * | 9/2004 | Yamazaki et al. | 180/268 |
| 6,925,654 | B2 | * | 8/2005 | De Silva | 2/108 |
| 6,951,033 | B2 | * | 10/2005 | Dainese | 2/69 |
| 7,076,206 | B2 | * | 7/2006 | Elferich et al. | 455/41.1 |
| 7,954,172 | B2 | * | 6/2011 | Hepler | 2/75 |
| 8,240,610 | B1 | * | 8/2012 | Cooper | 244/143 |
| 2005/0179244 | A1 | * | 8/2005 | Schroth | 280/808 |
| 2008/0252132 | A1 | * | 10/2008 | Thomson | 297/465 |
| 2011/0057500 | A1 | * | 3/2011 | Walker et al. | 297/465 |
| 2011/0062690 | A1 | * | 3/2011 | Kizaki | 280/735 |
| 2012/0217786 | A1 | * | 8/2012 | Kim | 297/465 |

(Continued)

FOREIGN PATENT DOCUMENTS

DE 199 25 759 1/2000

*Primary Examiner* — Paul N Dickson
*Assistant Examiner* — Darlene P Condra
(74) *Attorney, Agent, or Firm* — Kenyon & Kenyon LLP (57) ABSTRACT

A restraining device, for a rider of a vehicle, includes a restraining belt that is integratable or is integrated at least partly into a garment of the rider, the restraining belt being configured so as to encompass at least one bodily region of the rider, and includes a connecting element that is connectable or is connected to the restraining belt, the connecting element being configured to bind the rider detachably to the vehicle.

9 Claims, 5 Drawing Sheets (56) References Cited

U.S. PATENT DOCUMENTS

2012/0242134 A1* 9/2012 Siegel .......................... 297/465
2013/0221649 A1* 8/2013 Diez Marin et al. .......... 280/808
2014/0132055 A1* 5/2014 Jenkins ........................ 297/465

* cited by examiner

RESTRAINING DEVICE FOR A RIDER OF A VEHICLE, METHOD FOR USING SUCH A RESTRAINING DEVICE, GARMENT FOR A RIDER OF A VEHICLE, AND SAFETY SYSTEM FOR THE DETACHABLE BINDING OF A RIDER TO A VEHICLE

RELATED APPLICATION INFORMATION

The present application claims priority to and the benefit of German patent application no. 10 2013 214 298.6, which was filed in Germany on Jul. 22, 2013, the disclosure of which is incorporated herein by reference.

FIELD OF THE INVENTION

The present invention relates to a restraining device for a rider of a vehicle, a garment for a rider of a vehicle, a safety system for the detachable binding of a rider to a vehicle, and a method for using a restraining device for a rider of a vehicle.

BACKGROUND INFORMATION

Motorcycles and other vehicles on which a person sits in order to be transported are by far the most dangerous providers of motorized transportation for the riders. In 2008, the European accident database CARE (Community Database on Road Accidents) indicated that 5126 motorcycle riders were killed in accidents in 24 EU countries. That is 14% of the total of 37,234 traffic fatalities recorded in these 24 countries, although, according to CARE, persons riding motorized two-wheeled vehicles made up only 2% of all traffic participants (as of 2006). Compared to passengers in automobiles, motorcyclists are exposed to significantly higher risk in road traffic. This is due, inter alia, to the different driving physics and to the constantly unstable state of equilibrium, as well as to the particular physical and psychological stresses of motorcycle driving and the associated limited field of view. At the same time, motorcyclists are significantly more sensitive to weather conditions and other disturbing factors, such as poor road surface conditions or unforeseen traffic situations. In addition, the motorcycle does not have a protective body structure. In the case of collisions or accidents, despite protective clothing motorcyclists are unprotected traffic participants.

German patent document DE 19925759 A1 discusses an airbag for protecting a person from injuries, having a gas bag, a triggering device that makes it possible to inflate the gas bag as a result of an activation signal, and a sensor system that has a driving dynamics sensor connected to a vehicle, which makes it possible to determine a critical state of the driving dynamics and, after this determination, to produce the activation signal.

SUMMARY OF THE INVENTION

Against this background, the present invention presents a restraining device for a rider of a vehicle, a method for using such a restraining device, a garment for a rider of a vehicle, and a safety system for the detachable binding of a rider to a vehicle, as recited in the main claims. Advantageous embodiments result from the respective subclaims and from the following description.

In simulations and crash trials, the effectiveness of belt systems for motorized two-wheeled vehicles has already been demonstrated, in particular in the case of frontal accidents and in connection with airbags. Such systems include for example a belt integrated into an item of clothing of the rider.

A restraining device integrated completely or partly into an item of clothing of a rider, in the form of a belt system that surrounds at least one bodily region of the rider, offers, in addition to comfort advantages, a higher degree of protection from injury in the case of accident.

In a development of the approach proposed here, a voltage supply to electronic components in the garment, and communication therewith, can be realized via a belt of the restraining device. Electrical contacts required for the voltage supply can for example be integrated into a belt buckle or a belt tongue or insertion tongue of the restraining device.

Through the integration of the belt system into the clothing of the rider, a comfortable use is enabled with improved effect of the restraint system. In addition to lap belts, for example shoulder belts, etc., can also be integrated into the garment in order to further improve the restraining effect. A—possibly awkward—donning of the safety belt is omitted, and the process of putting on the belt is limited to fastening the buckle, analogous to an automobile.

A further advantage of the configuration here proposed is that through the proposed connection of the restraining device to a vehicle power supply, the accumulators or the like provided for the supply of power to electronic components on or near the body of the rider can be omitted, or can be made smaller. The electronic components can here be for example systems for passive safety, or also a mobile telephone of the rider. In addition to the advantage that a power supply no longer has to be integrated into the clothing, the fact that, an enormous gain in safety can be realized because the systems integrated into the clothing can be reliably operated over the entire duration of the trip is significant in particular in relation to passive safety systems, such as an airbag jacket.

In addition, through the integrated communication interface a robust connection—and one that is less expensive and less liable to disturbance in comparison with radio systems—to corresponding vehicle systems is possible, e.g. to control devices for triggering a jacket airbag, to vehicle communication or entertainment systems, to the HMI, etc.

The described comfort advantages create good chances for overcoming reservations that potential users may have regarding belt systems for motorized two-wheeled vehicles, so that the possibility of securing motorcyclists using restraint systems in the case of a collision can be more widely used in the future.

A restraining device for a rider of a vehicle has the following features:
  a restraining belt that is integrated or can be integrated at least partly into a garment of the rider, the restraining belt being configured to encompass at least one bodily region of the rider; and
  a connecting element, connectible to or connected to the restraining belt, that is configured to detachably bind the rider to the vehicle.

The vehicle can be a vehicle that can be used in road traffic on which a person sits during operation, so that the body of the person is not surrounded, or is only partly surrounded, by a housing or body structure. For example, the vehicle can be a motorized two-wheeled vehicle such as a motorcycle. Correspondingly, a person using or operating the vehicle can be designated the rider. The restraining device can be understood as a device that is suitable to connect the rider to the vehicle in such a way that, for example in the case of a collision of the vehicle with an object, a relative movement of the rider in relation to the vehicle, caused by the impact energy during the collision, can be prevented. In this way, an impact of the rider against the object, causing injury, can be avoided. The garment can be for example a jacket or a vest. The restraining belt can have a one-part or multi-part construction, and can be integrated, or capable of being integrated, into the garment in such a way that it extends longitudinally and/or transversely in the garment, over the whole circumference or over a part thereof, and has at least one first and second end that can be connected to one another in such a way that the restraining belt forms a kind of sling that is suitable for securely encompassing at least one bodily region of the rider.

Here it can be useful that the restraining belt runs in an inner region of the garment. The connecting element can be configured so as to be connected fixedly to the restraining belt, or so as to be able to be connected as needed to the restraining belt and removed again as needed by a user of the restraining device. The connecting element can here be connected to the restraining belt in such a way that it can be reached and operated from outside the garment. The connecting element can in particular be configured so as to be able to be coupled to the vehicle with a suitable counterpiece in such a way that the detachable connection results between the restraining belt and the vehicle. The detachability of the binding of the rider to the vehicle can be understood such that the binding can either be detached by the rider himself or herself when the protective function provided by the restraining device is no longer required, or, alternatively, the binding can be specified such that it detaches itself automatically, without action on the part of the rider, in particular situations, in the case of accidents that make this necessary, for example lateral sliding away of the vehicle.

According to a specific embodiment of the restraining device, the restraining belt can be configured so as to encompass a shoulder region and/or a chest region and/or a pelvic region of the rider as, the bodily region. For this purpose, the restraining belt can run along the corresponding regions in a garment configured as a jacket or vest. Such an advantageous placement of the restraining belt on the body of the rider makes it possible to decelerate a movement of the rider caused by collision in a way that places as little stress as possible on the human body and at the same time has the most effective restraining function.

For example, the connecting element can be a belt buckle or an insertion tongue of a coupling system for coupling the restraining device to the vehicle. Here, the connecting element can have the belt buckle if a corresponding counterpiece at the vehicle side of the coupling system has the insertion tongue, and can have the insertion tongue if the corresponding counterpiece at the vehicle side has the belt buckle. This specific embodiment of the binding of the rider to the vehicle is distinguished by low production costs, a wide variety of possible realizations of the product, and easy operation for the user.

In particular, the connecting element can have at least one first electrical contact terminal. This can be configured so as to form, in a coupled state of the coupling system, an interface to a second electrical contact terminal assigned to the vehicle. Thus, the connecting element can advantageously provide, in addition to the mechanical coupling, a second function of voltage transmission without requiring additional components for this.

According to a specific embodiment of the restraining device, the connecting element can have at least one further first electrical contact terminal. Here, the first electrical contact terminal can be configured so as to be connected to an energy supply line of the restraining device, and the further first electrical contact terminal can be configured to be connected to a data transmission line of the restraining device. In this way, information can be communicated between the vehicle and the restraining device while at the same time a constant supply of power to devices coupled to the restraining belt can be ensured. Both the energy supply line and the data transmission line can be configured so that they run along or inside the restraining belt. An advantageous of this specific embodiment is in particular the fact that for the data transmission a robust physical connection can be used that is significantly less susceptible to disturbance than a radio link.

For example, the restraining device can have an output contact terminal. The output contact terminal can be configured to transmit electrical voltage received from the electrical contact terminal and/or from the further electrical contact terminal to a rider protection device that is coupled, or is capable of being coupled, to the restraining device and is situated at a distance from the electrical contact terminal and/or from the further electrical contact terminal, or to a communication device that is coupled, or is capable of being coupled, to the restraining device and is situated at a distance from the electrical contact terminal and/or from the further electrical contact terminal.

The output contact terminal can be correspondingly configured to provide a supply of power and/or information to suitable devices. For this purpose, the output contact terminal can for example be connected to the corresponding device via a short line. In the case of the rider protection device, an airbag integrated into the garment for the impact protection of the rider can for example be the device. In the case of a communication device, a mobile telephone for example placed into a suitable inner pocket of the garment can be the device. In this specific embodiment, with regard to safety and comfort high demands can be met, because for example additional accumulators for the mobile telephone and a portable energy supply for the airbag are omitted.

According to a further specific embodiment, the restraining device can be a further connecting element that is configured to additionally bind the rider to the vehicle in a detachable manner. Through the use of the further connecting element, the restraining function of the restraining device can be still further improved.

According to one of the specific embodiments explained above, a garment for a rider of a vehicle has a restraining device integrated into the garment. The restraining device can for example be integrated into the garment by being sewn into an inner lining of the garment. Alternatively, the restraining device can be placed into the garment by inserting it into a material channel, and can be removed therefrom by pulling it out if it is not required or has to be changed.

According to a specific embodiment, the garment can be configured as a jacket or vest. Correspondingly, the restraining device can be brought into a suitable position when the rider puts on the jacket or vest, and can be fastened by closing a closure device of the jacket or vest. In this way, a complicated donning of an external restraint or safety belt, which in some circumstances may not be performed correctly, can advantageously be omitted.

A safety system for the detachable binding of a rider to a vehicle has a vehicle connecting element for coupling the safety system to a restraining device according to one of the specific embodiments explained above, the vehicle connecting element having at least one second electrical contact terminal. Analogous to the connecting element, the vehicle connecting element can be realized as a belt buckle or insertion tongue, depending on how the connecting element is configured. The safety system can be configured in such a way that the vehicle connecting element is fastened at one end of a belt that can be rolled up and that is situated in the vehicle, so that when the vehicle connecting element is coupled to the connecting element of the restraining belt, the rider can be guaranteed freedom of movement within suitable limits. Via the second electrical contact, a transmission of an electrical voltage between the vehicle and the restraining device can be ensured.

A method for using a restraining device for a rider of a vehicle has the following steps:
  encompassing of at least one bodily region of the rider by a restraining belt that can be integrated or is integrated at least partly in a garment of the rider; and
  detachable binding of the rider to the vehicle by a connecting element that is connected to or can be connected to the restraining belt.

An object of the present invention can be achieved quickly and efficiently as well by this variant embodiment of the present invention in the form of a method.

The present invention further creates a control device that is configured to carry out or realize the steps of the method according to the present invention in corresponding devices. Through this variant embodiment of the present invention in the form of a control device as well, the object of the present invention can be achieved quickly and efficiently.

In the present context, a control device can be understood as an electrical device that processes sensor signals and outputs control and/or data signals as a function thereof. The control device can have an interface that can be realized in terms of hardware and/or in terms of software. In the case of a realization in terms of hardware, the interfaces can for example be part of a so-called system ASIC that contains a wide range of functions of the control device. However, it is also possible for the interfaces to be separate integrated circuits, or to be made up at least partly of discrete components. In the case of a realization in terms of software, the interfaces can be software modules that for example are present on a microcontroller alongside other software modules.

In the following, the present invention is explained in more detail with reference to examples based on the accompanying drawings.

DETAILED DESCRIPTION

In the following description of exemplary embodiments of the present invention, identical or similar reference characters are used for elements shown in the various Figures having similar function, and repeated description of these elements is omitted.

Figure 1:
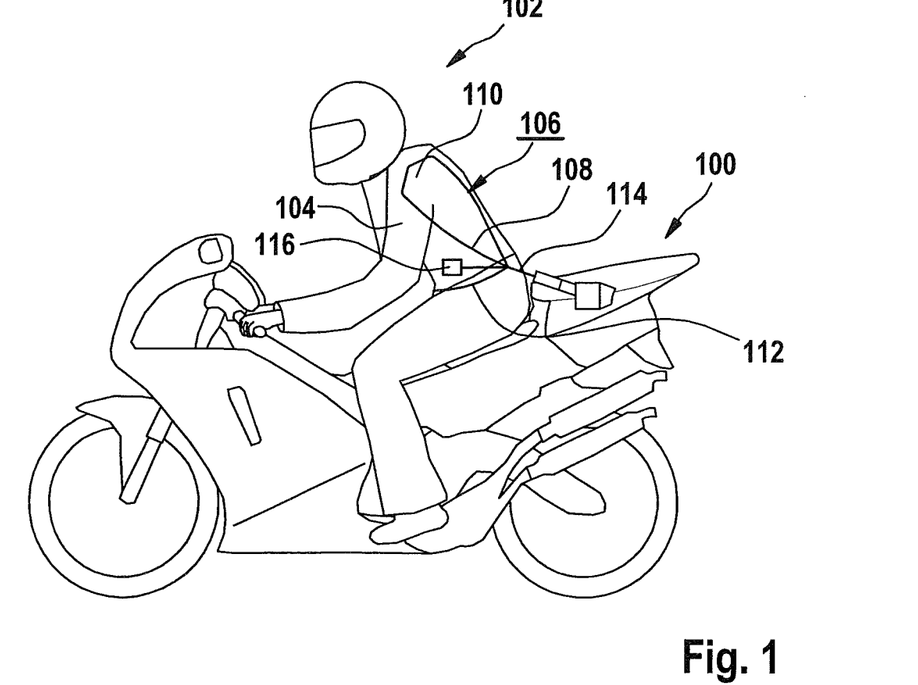
FIG. 1 shows a representation of a rider on a vehicle connected to a restraining device according to an exemplary embodiment of the present invention.

FIG. 1 shows, on the basis of an overall view, a belt system proposed herein for motorcycles. Shown is a vehicle 100 having a driver 102, referred to hereinafter as the rider. Vehicle 100 is in this case a motorcycle. Vehicle 100 can alternatively be any motorized two-wheeled vehicle or comparable vehicle on which a person sits, i.e. in which during operation of vehicle 100 the person is not situated inside a vehicle body structure. Rider 102 can also be, in addition to the driver, a pillion rider or additional passenger.

As shown in FIG. 1, a garment 104—here a motorcycle jacket—of rider 102 is equipped with a restraining device 106 for restraining rider 102 in the case of an accident. Restraint system or restraining device 106 includes a restraining belt 108 that is integrated into garment 104 of rider 102. With belt 108 and a corresponding counterpiece mounted on vehicle 100, restraining device 106 forms an overall system. Restraining belt 108 is distinguished in that it encompasses a bodily region or a plurality of bodily regions of rider 102. In the exemplary embodiment of restraining device 106 shown in FIG. 1, restraining belt 108 encompasses a shoulder region 110 and a pelvic region 112 of rider 102. Depending on the embodiment of restraining device 106, for example a single belt 108 can be provided centrically, or two belts 108 can be provided, for example respectively to the right and to the left of center. Rider 102 is detachably bound to vehicle 100 via a connecting element 114 connected to restraining belt 108. Via electrical contacts integrated into a belt buckle or insertion tongue of connecting element 114, in addition electronic components 116 integrated into motorcycle garment 104 can be supplied with power, and/or communication can take place between vehicle 100 and electronic components 116. This is described in more detail on the basis of subsequent Figures. In FIG. 1, electronic component 116 forms for example an electronics system for an airbag integrated into jacket 104.

In the embodiment shown in FIG. 1 of integrated restraining device 106 in connection with motorcycle jacket 104, restraining belt 108 is sewn into jacket 104, and is joined at the back part of jacket 104 in the belt coupling or connecting element 114. Belt 108 is made in such a way that it prevents or reduces a rotation of rider 102 about the transverse axis as observed in the case of front collisions. This prevents the distance of the head of rider 102 from an obstacle from rapidly decreasing in an early crash phase, leaving more room for a controlled deceleration of the rider. This reduces the severity of injury to be expected in the case of a front collision. Here, belt coupling 114 is made in such a way that an insertion tongue (not shown) on a short connecting belt is connected in non-detachable configured to jacket 104. Alternatively, belt coupling 114 is detachably connected to garment 104 through deliberate coupling and decoupling.

Figure 2A:
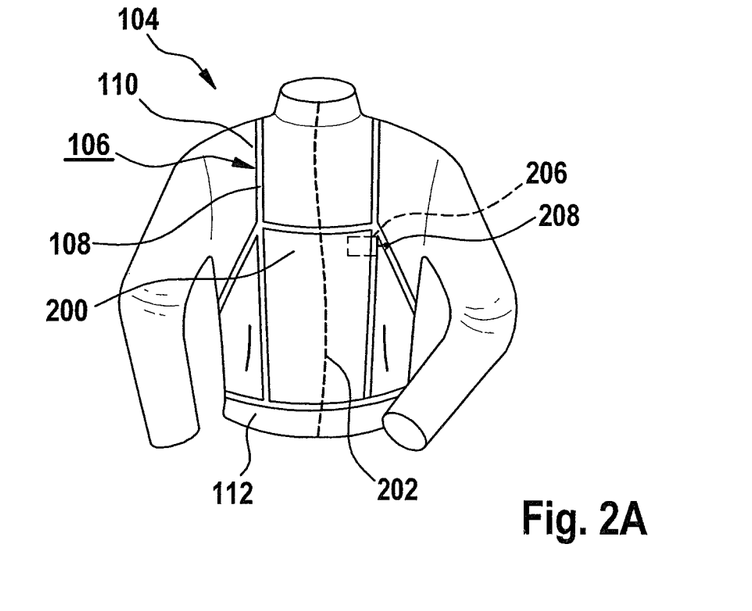
FIG. 2A shows a front view of the restraining device of FIG. 1 according to an exemplary embodiment of the present invention.

FIG. 2A shows, in a front view, garment 104 of FIG. 1, into which an exemplary restraining device 106 is integrated. Garment 104 is here configured as a jacket. According to alternative exemplary embodiments, garment 104 is configured as a vest, or as trousers, etc. Apart from integrated or integratable restraining belt 108, jacket 104 can be a conventional motorcycle jacket having features and functions typical thereof. Thus, motorcycle jacket 104 can be made of a tough, wind-deflecting material, and can have material reinforcements at suitable locations.

In the exemplary embodiment of motorcycle garment 104 shown in FIG. 2A, with integrated belt system, restraining belt 108 is made up of pelvic, chest, and shoulder belts, and is correspondingly configured and integrated into jacket 104 in such a way that it encompasses shoulder region 110, pelvic region 112, and additionally also a chest region 200 of jacket 104, and thus also of a person wearing jacket 104. When jacket 104 is put on, restraining belt 108 is automatically also donned.

In the exemplary embodiment shown in FIG. 2A, restraining belt 108, or the individual parts of belt 108, is/are realized on an inner side of jacket 104, and are secured against unintentional slippage by being sewn into a lining of jacket 104. Alternatively, the restraining belt can be inserted into the jacket and pulled out again when it is not required. For this purpose, the inner lining of jacket 104 can have corresponding pockets or tunnels. A length of individual partial segments of restraining belt 108 is made adjustable, so that the rider wearing jacket 104 is not cramped during normal driving conditions, but during an accident belt 108 absorbs the occurrent tensile stresses and effectively restrains the rider. Restraining belt 108 is sewn, in sections, into the right and left side of garment 104, and is closed overall by a closure mechanism or closure device 202 of jacket 104, in this case a zipper. According to an alternative exemplary embodiment, restraining belt 108 is closed via a separate closure device. Garment 104 can alternatively or in addition be equipped with a restraining belt 108 on the material outer side.

Drivers of two-wheeled vehicles often carry one or more electronic components in their clothing. An example of an electronic component 206 is shown in FIG. 2A. Here electronic component 206 is an electronics system of a rider protection device in the form of an airbag integrated into jacket 104 (airbag jacket) or some other component of the passive safety system, alternatively an HMI interface of a driver assistance system such as a head-up display or a safety light in helmet and/or jacket 104. Alternatively, electronic component 206 can be a telecommunications device such as a smart phone, an entertainment product, or the like. As mentioned above, a plurality of electronic components 206 can be integrated into garment 104. In the future, this trend will continue to increase. All described electronic systems have in common that in order to function they have to be provided with power and capable of communication. Through the power supply via the connecting element, as proposed herein, an accumulator integrated into garment 104 can be omitted or can be made smaller. Separate cables can also be omitted. Within garment 104, the forwarding of the power is enabled via lines allocated to the restraining belt. For power output to electronic components 206, restraining device 106 has an output contact terminal 208. In the exemplary embodiment shown in FIG. 2A, electronic component 206 is connected directly to output contact terminal 208, and is in this way supplied with power.

Figure 2B:
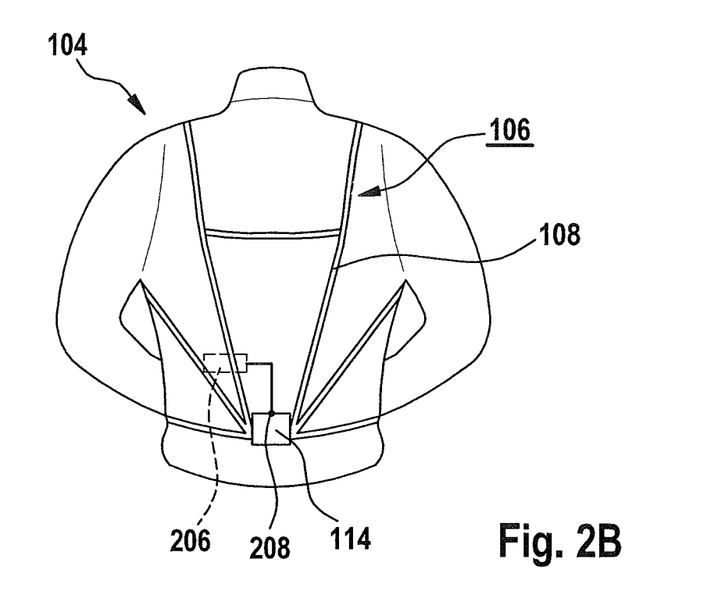
FIG. 2B shows a rear view of the restraining device of FIG. 2A according to an exemplary embodiment of the present invention.

FIG. 2B shows a rear view of jacket 104 with restraining device 106 from FIG. 2A. Here it can be seen clearly how individual segments of restraining belt 108 run together at the back of garment 104 and join at connecting element 114. Connecting element 114 here has an insertion tongue. Alternatively, connecting element 114 has a belt buckle. In addition, in FIG. 2B a further electronic component 206 is shown that is supplied with power via a further output contact terminal 208 of restraining device 106. Here, output contact terminal 208 is situated directly on connecting element 114. In order to bridge the voltage to the position in garment 104 at which further electronic component 206 is situated, an electrical line 210 runs from output contact terminal 208 to further electronic component 206.

Figure 3:
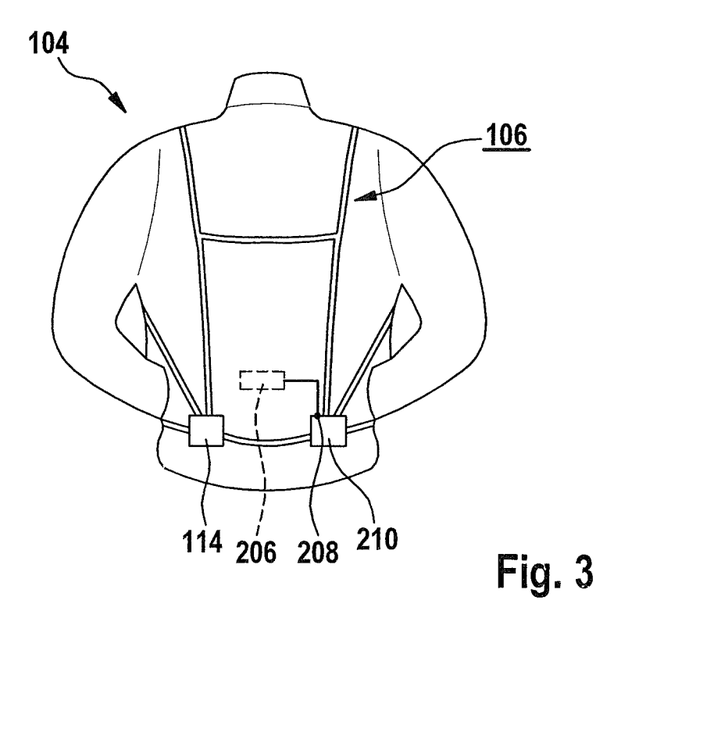
FIG. 3 shows a rear view of the restraining device of FIG. 1 according to a further exemplary embodiment of the present invention.

FIG. 3 shows a rear view of an example of a jacket 104 in which an alternative exemplary embodiment of restraining device 106 is integrated. In this alternative realization of the belt, restraining device 106 has, in addition to connecting element 114, a further connecting element 210. Analogous to connecting element 114, further connecting element 210 can be configured either as an insertion tongue or as a belt buckle. Or, it can be configured conversely to connecting element 114, i.e. as an insertion tongue if connecting element 114 is configured as a belt buckle, or vice versa. In this embodiment, the rider is bound to the vehicle at two points, i.e. via two external belts. Here, further connecting element 210 has output contact terminal 208.

Figure 4A:
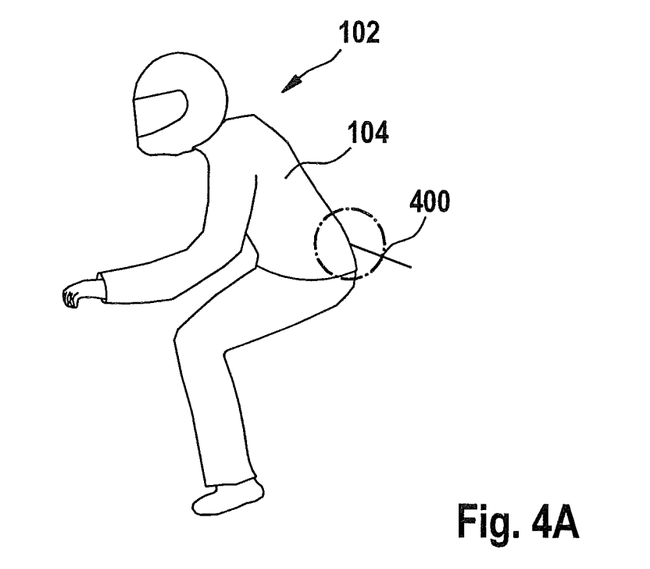
FIG. 4A shows a representation of the binding of the rider to the vehicle according to an exemplary embodiment of the present invention.

FIG. 4A shows a rough depiction of the binding of rider 102 to the vehicle. The vehicle, and the connecting element situated in the back of garment 104, are not shown here. Shown here is an external belt 400 of a vehicle-side safety system for the detachable binding of rider 102 to the vehicle. The belt is coupled to the connecting element of the restraining device, and binds rider 102 to the vehicle. The safety system is explained in more detail below on the basis of FIG. 5A. At the vehicle side, for external belt 400 an automatic roll-up device is provided in order not to limit the freedom of movement of rider 102 during normal driving conditions. Similar to automobile safety belts, belt 400 is blocked in the case of an accident. Alternatively, a belt force limiter and/or belt tensioner are also used.

Figure 4B:
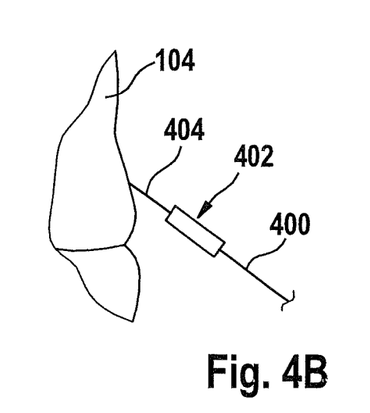
FIG. 4B shows a detailed view of the binding according to an exemplary embodiment of the present invention.
Figure 4C:
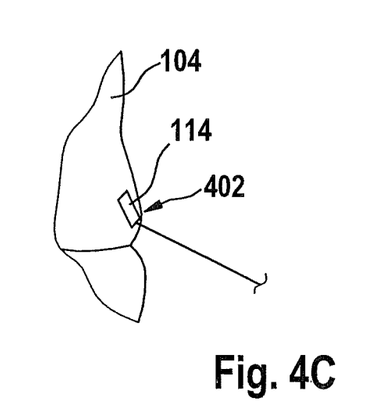
FIG. 4C shows a detailed view of the binding according to a further exemplary embodiment of the present invention.

FIGS. 4B and 4C show, on the basis of detailed views from FIG. 4A, two configurations of the binding of external belt 400 to garment 104 of the rider, or to the restraining device integrated into garment 104. In principle, here for the binding of the jacket belt system to the vehicle belt system, a corresponding closure system or coupling system 402 is used that is made up of a belt buckle and a mating insertion tongue, similar to the systems used in automobiles. Either the belt buckle or the insertion tongue can be integrated into garment 104, or can be connected to garment 104.

In the exemplary embodiment of coupling system 402 shown in FIG. 4B, the driver-side connecting element is connected to garment 104, or to the restraining belt integrated into garment 104, via a short, fixed connecting belt 404.

In the exemplary embodiment of coupling system 402 shown in FIG. 4C, driver-side connecting element 114, which here as an example has or forms the belt buckle, is completely integrated into garment 104.

Figure 5A:
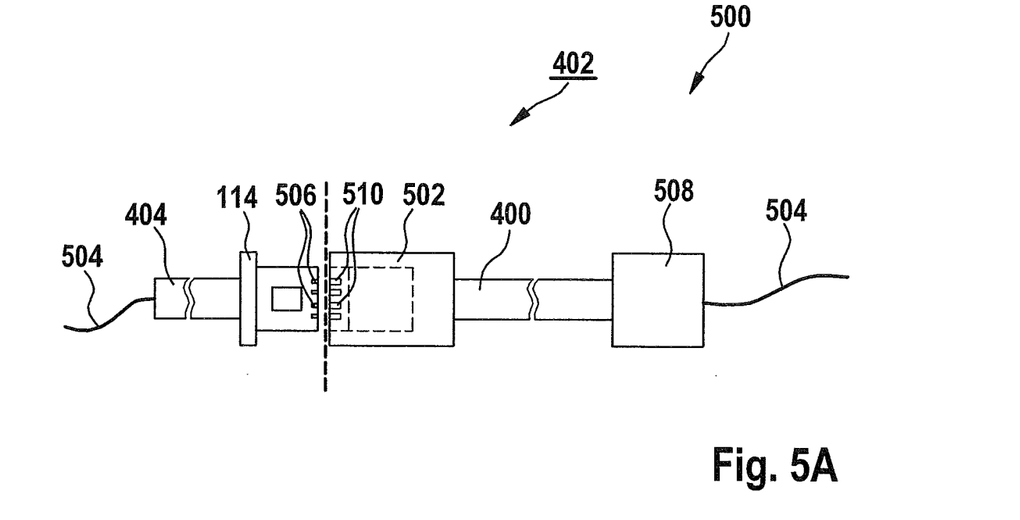
FIG. 5A shows a belt system for coupling the restraining device to the vehicle according to an exemplary embodiment of the present invention.

FIG. 5A shows in detail the belt system or coupling system 402 for coupling the restraining device to the vehicle, including electrical contacts and integrated cable for supplying power to and communication with electrical components in the garment of the rider, according to an exemplary embodiment of the present invention. Coupling system 402 is shown in a top view. To the right of the dashed line, a safety system 500 is shown for the detachable binding of the rider to the vehicle. To the left of the dashed line, connecting element 114 is shown, which is connected to the restraining device. In the exemplary embodiment of coupling system 402 shown here, connecting element 114 is configured as an insertion tongue, and a vehicle connecting element 502 is configured as a belt buckle. By inserting insertion tongue 114 into belt buckle 502, coupling system 402 is closed, i.e. the driver is bound to the vehicle. By pressing a button or switch (not shown), insertion tongue 114 can be withdrawn from belt buckle 502, and the binding of the driver to the vehicle is detached.

Here, connecting element 114 is fastened to connecting belt 404 explained on the basis of FIG. 4B. Alternatively, connecting element 114 is connected directly to the restraining belt. In connecting belt 404 there runs a line or cable 504 that is connected to four first electrical contact terminals 506 situated in insertion tongue 114. Via line 504, upon coupling by coupling system 402 an electrical voltage is forwarded from the vehicle to a rider protection device that is coupled, or can be coupled, to the restraining device. Alternatively or in addition, via line 504 a communication device that is coupled or can be coupled to the restraining device. It is also possible to use two separate lines in order to realize the data transmission and the energy supply separately.

At the vehicle side, belt buckle 502 is connected to the chassis via external belt 400, here by an automatic roll-up mechanism 508, similar to that in automobiles. Roll-up mechanism 508 includes for example a belt winder or belt tensioner or belt force limiter. During normal driving conditions, belt 400 can be pulled out by applying relatively small tensile forces, and therefore does not hinder the freedom of movement of the rider. External belt 400 also has a cable guide for guiding cable 504. For connection to a vehicle power source, belt tensioner 508 has a cable guide and contacts. Analogous to insertion tongue 114, vehicle connecting element 502 has four second electrical contact terminals 510. In an alternative exemplary embodiment, more or fewer first electrical contact terminals 506 and second electrical contact terminals 510 are used.

Via line 504, belt buckle 502 and insertion tongue 114 create the power or data supply for electronic components integrated in the garment or worn in or on the garment. In particular, here electronics for airbag jackets, smartphones that are carried by the rider, communication devices, etc. are to be mentioned. In addition, via belt system 402 an electrical communication interface is provided for components of the active or passive safety system, communication systems, or HMI components. The binding takes place via electrical contacts 506, 510, which are integrated into belt buckle 502, into belt tongue 114, and into corresponding belts 400, 404. The number of electrical contacts 506, 510 that are present is, as mentioned, variable according to the concrete requirements of the situation.

For this purpose, electrical contacts 506, 510 are closed by plugging belt tongue 114 into belt buckle 502. In belt part 505 connected to belt tongue 114, cable 504 is integrated in a suitable manner, ending in the jacket and there providing the connection to and supply of the electrical components. Analogously, in belt 400 connected to belt buckle 502 a further segment of cable 504 is integrated, which is contacted in a suitable manner in the belt at the vehicle side, e.g. via sliding contacts on the belt winder. Cable 504 is led out from belt receptacle 508 and can be further routed in the vehicle.

According to alternative exemplary embodiments of the restraint system presented herein, belt buckle 502 is integrated into jacket 104, or insertion tongue 114 is bound to vehicle 100. In addition, the binding of belt coupling 402 to motorcycle garment 104 can be realized with or without short belt piece 404. According to a further exemplary embodiment, the system has two external belts 400. The electrical connection takes place via at least one belt. Incorporation of further components into the electrical system of the vehicle (supply voltage and/or communication) is also possible, as is communication via at least one bus system or in the form of a point-to-point connection. In addition, a plurality of supply voltages can be provided.

Figure 5B:
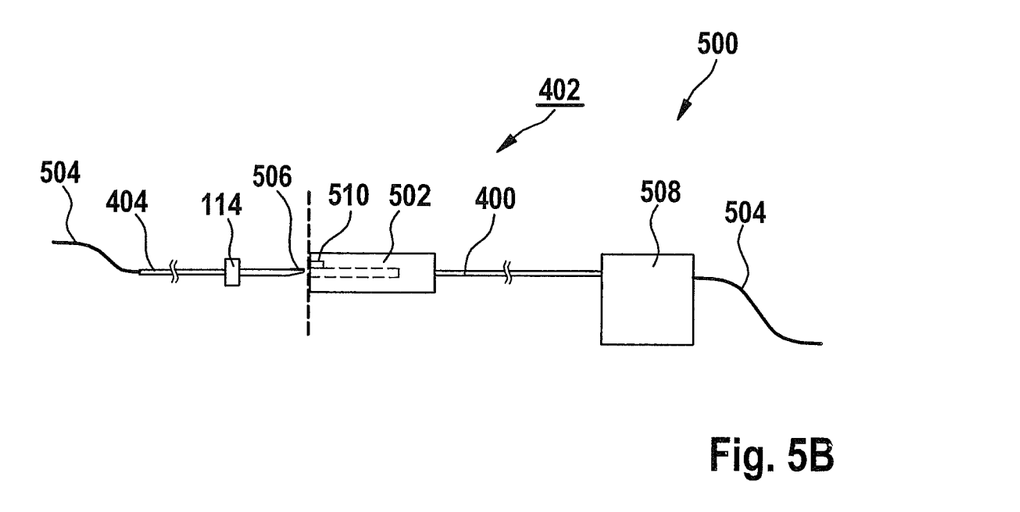
FIG. 5B shows a side view of the belt system of FIG. 5A.

FIG. 5B shows the belt system or coupling system 402 from FIG. 5A, in a side view.

Figure 6:
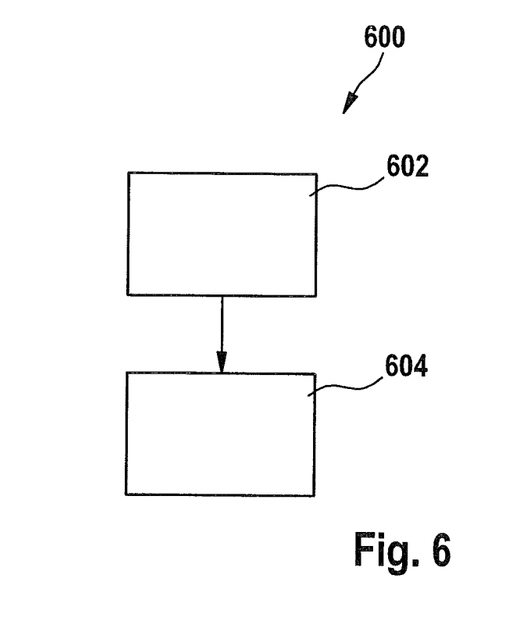
FIG. 6 shows a flow diagram of a method for using a restraining device for a rider of a vehicle according to an exemplary embodiment of the present invention.

FIG. 6 shows an exemplary embodiment of a flow diagram of a method 600 for using a restraining device for a rider of a vehicle. Method 600 can be used in connection with the restraining device shown in the Figures. In a step 602, a garment having the restraining device is donned in such a way that a restraining belt integrated into the garment completely or partly encompasses at least one bodily region of the rider. In a step 604, the rider is detachably bound to the vehicle via a connecting element connected to the restraining belt.

The configuration presented herein of a safety belt system for motorcycles enables an optimal integration of a motorcycle safety belt into an overall configuration for passive safety of motorcycles. An improved restraining device for motorcycles that increases the passive safety of the rider or riders has been described. At the same time, there is the possibility, via the belt connection, of supplying power to electronic components in the garment, and of communicating with these components.

The exemplary embodiments described and shown in the Figures have been chosen only as examples. Different exemplary embodiments can be combined with one another entirely or with regard to individual features. An exemplary embodiment can also be supplemented with features of a further exemplary embodiment.

In addition, method steps according to the present invention can be repeated, or can be executed in a sequence differing from that described.

If an exemplary embodiment includes an "and/or" linkage between a first feature and a second feature, this is to be read as meaning that the exemplary embodiment, according to a specific embodiment, has both the first feature and the second feature, and according to a further specific embodiment has either only the first feature or only the second feature.

What is claimed is:

1. A restraining device for a rider of a vehicle, comprising:
a restraining belt that is integratable or is integrated at least partly into a garment of the rider, the restraining belt being configured so as to encompass at least one bodily region of the rider; and
a connecting element that is connectable or is connected to the restraining belt, and that is configured to bind the rider detachably to the vehicle;
wherein the connecting element has at least one first electrical contact terminal; and
wherein the connecting element has at least one further first electrical contact terminal, the first electrical contact terminal being configured to be connected to an energy supply line of the restraining device, and the further first electrical contact terminal being configured to be connected to a data transmission line of the restraining device.

2. The restraining device of claim 1, wherein the restraining belt is configured to encompass at least one of a shoulder region, a chest region, and a pelvic region of the rider as a bodily region.

3. The restraining device of claim 1, wherein the connecting element has a belt buckle or an insertion tongue of a coupling system for coupling the restraining device to the vehicle.

4. The restraining device of claim 1, further comprising:
an output contact terminal to transmit electrical voltage received from the first electrical contact terminal and/or from the further first electrical contact terminal to a rider protection device that is coupled or couple-able to the restraining device and is situated at a distance from the first electrical contact terminal and/or from the further first electrical contact terminal, or to a communication device that is coupled, or couple-able to the restraining device and that is situated at a distance from the first electrical contact terminal and/or from the further first electrical contact terminal.

5. The restraining device of claim 1, further comprising:
a further connecting element to additionally bind the rider detachably to the vehicle.

6. A garment for a rider of a vehicle, comprising:
a garment arrangement having an integrated restraining device;
wherein the restraining device includes a restraining belt that is integratable or integrated at least partly into a garment of the rider, the restraining belt being configured so as to encompass at least one bodily region of the rider; and
a connecting element that is connectable or is connected to the restraining belt, and that is configured to bind the rider detachably to the vehicle;
wherein the connecting element has at least one first electrical contact terminal; and
wherein the connecting element has at least one further first electrical contact terminal, the first electrical contact terminal being configured to be connected to an energy supply line of the restraining device, and the further first electrical contact terminal being configured to be connected to a data transmission line of the restraining device.

7. The garment of claim 6, wherein the garment is configured as a jacket or vest, the restraining device being brought to a suitable position when the rider dons the jacket or vest, and being closed by closing a closure device of the jacket or vest.

8. A safety system for detachably binding a rider to a vehicle, comprising:
a safety system arrangement; and
a vehicle connecting element for coupling the safety system arrangement to a restraining device, the vehicle connecting element having at least one second electrical contact terminal;
wherein the restraining device includes a restraining belt that is integratable or integrated at least partly into a garment of the rider, the restraining belt being configured so as to encompass at least one bodily region of the rider, and a connecting element that is connectable or is connected to the restraining belt, and that is configured to bind the rider detachably to the vehicle;
wherein the connecting element has at least one first electrical contact terminal; and
wherein the connecting element has at least one further first electrical contact terminal, the first electrical contact terminal being configured to be connected to an energy supply line of the restraining device, and the further first electrical contact terminal being configured to be connected to a data transmission line of the restraining device.

9. A method for using a restraining device for a rider of a vehicle, the method comprising:
encompassing at least one bodily region of the rider by at least one restraining belt that is integratable or is integrated at least partly into a garment of the rider; and
detachably binding the rider to the vehicle by a connecting element that is connectable or is connected to the restraining belt;
wherein the connecting element has at least one first electrical contact terminal; and
wherein the connecting element has at least one further first electrical contact terminal, the first electrical contact terminal being configured to be connected to an energy supply line of the restraining device, and the further first electrical contact terminal being configured to be connected to a data transmission line of the restraining device.

* * * * *